(12) United States Patent
Flaherty et al.

(10) Patent No.: US 12,443,516 B2
(45) Date of Patent: Oct. 14, 2025

(54) SYSTEMS AND METHODS FOR AUTOMATED GENERATIVE DATA LOSS PREVENTION TESTING

(71) Applicant: Capital One Services, LLC, McLean, VA (US)

(72) Inventors: Kyle Flaherty, Richmond, VA (US); Humza Jaffri, Arlington, VA (US); John Fox, Arlington, VA (US); Scott Jason Schenkein, Midlothian, VA (US); Katherine Hall, Lawrenceville, GA (US); David DaSilva, New York, NY (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 55 days.

(21) Appl. No.: 18/591,190

(22) Filed: Feb. 29, 2024

(65) Prior Publication Data
US 2025/0278355 A1    Sep. 4, 2025

(51) Int. Cl.
*G06F 11/36* (2025.01)
*G06F 11/3668* (2025.01)

(52) U.S. Cl.
CPC ...... *G06F 11/3688* (2013.01); *G06F 11/3684* (2013.01)

(58) Field of Classification Search
CPC ... G06F 11/36; G06F 11/3688; G06F 11/3684
See application file for complete search history.

(56) References Cited

U.S. PATENT DOCUMENTS

| | | | | |
|---|---|---|---|---|
| 11,451,550 | B2* | 9/2022 | Sloane | H04L 63/1433 |
| 11,966,470 | B2* | 4/2024 | Yuceer | G06F 21/552 |
| 12,101,342 | B2* | 9/2024 | Myers | H04L 63/1408 |
| 2016/0277360 | A1* | 9/2016 | Dwyier | H04L 63/1416 |
| 2019/0036955 | A1* | 1/2019 | Langton | H04L 63/1425 |
| 2019/0141061 | A1* | 5/2019 | Krishtal | H04L 63/101 |
| 2021/0288981 | A1* | 9/2021 | Numainville | H04L 63/1416 |
| 2021/0288986 | A1* | 9/2021 | Myers | H04L 63/1441 |
| 2021/0336958 | A1* | 10/2021 | Sloane | G06N 20/00 |
| 2023/0153425 | A1* | 5/2023 | Yuceer | H04L 63/1425 726/23 |
| 2024/0348649 | A1* | 10/2024 | Schwartz | H04L 63/20 |
| 2025/0165633 | A1* | 5/2025 | Lindquist | G06F 21/552 |

* cited by examiner

*Primary Examiner* — Kamini B Patel
(74) *Attorney, Agent, or Firm* — TROUTMAN PEPPER LOCKE LLP; Christopher J. Forstner; John A. Morrissett (57) ABSTRACT

Disclosed embodiments may include a method for automated generative data loss prevention testing. The system may include one or more processors, and memory in communication with the one or more processors and storing instructions that, when executed by the one or more processors, are configured to cause the system to receive an instruction to perform data exfiltration prevention testing, select one or more data element types and one or more data channels, and select, based on the one or more data element types, one or more test data generation programs from a plurality of test data generation programs. In some embodiments, the memory can be further configured to cause the system to generate and utilize a set of test data to conduct data exfiltration prevention testing. The data exfiltration prevention testing can be conducted by executing one or more transfers and monitoring the one or more data channels.

20 Claims, 4 Drawing Sheets

SYSTEMS AND METHODS FOR AUTOMATED GENERATIVE DATA LOSS PREVENTION TESTING

CROSS-REFERENCE TO RELATED APPLICATIONS

This application relates to U.S. patent application Ser. No. 18/591,019, filed Feb. 29, 2024, listing David Wolkiser, Alexander Kent, and Kyle Flaherty as inventors, and entitled "SYSTEMS AND METHODS FOR DETERMINING EFFECTIVENESS OF DATA LOSS PREVENTION TESTING," the entire contents of which are hereby fully incorporated by reference as if fully set forth herein.

FIELD

The disclosed technology relates to systems and methods for automated generative data loss prevention testing. Specifically, this disclosed technology relates to using machine learning models and graphical user interfaces to generate a set of test data for use during testing of data exfiltration prevention software programs.

BACKGROUND

The protection of data from exfiltration is becoming increasingly difficult to stop and detect. To be able to properly test the available data exfiltration prevention software programs, test data needs to be generated for use during the testing of these programs. However, traditionally static data was created for use during the testing of data exfiltration prevention software programs. However, the traditional creation of static test data is highly inefficient, time consuming, and costly. Additionally, if the same static test data is used repeatedly during the testing of the available data exfiltration prevention software programs, the data exfiltration prevention software programs can then be configured to catch the errors related only to the specific static test data. For example, if the testing data involved a creation of a random social security number in a format such as '234-62-1345,' the exfiltration prevention software programs would be trained to identify the number based on the two dashes and the ten digits. However, the same program might fail to detect a social security number sent in an email written in an alternative format such as 'hereisthesocial: 1345752345' due to the lack of dashes and spacing. When the static test data comprises only ten digit numbers (with or without dashes), then data exfiltration prevention software programs can easily be configured to pass a test with the static test data.

Accordingly, there is a need for improved systems and methods for automated, dynamic, and generative data loss prevention testing. Embodiments of the present disclosure are directed to this and other considerations.

SUMMARY

Disclosed embodiments may include a system for automated generative data loss prevention testing. The system may include one or more processors, and memory in communication with the one or more processors and storing instructions that, when executed by the one or more processors, are configured to cause the system to provide automated generative data loss prevention testing by receiving an instruction to perform data exfiltration prevention testing. In some embodiments, the memory, when executed by the one or more processors, are further configured to select, based on the instruction to perform data exfiltration prevention testing, one or more data element types and one or more data channels upon which to perform the data exfiltration prevention testing, select, based on the one or more data element types, one or more test data generation programs from a plurality of test data generation programs, and generate, using the one or more test data generation programs, a set of test data that comprises sample data of the one or more data element types. In some embodiments, the memory, when executed by the one or more processors, are further configured to utilize the set of test data to conduct the data exfiltration prevention testing by executing one or more transfers of at least a portion of the set of test data via the one or more data channels and monitoring, utilizing one or more data exfiltration prevention software programs, the one or more data channels to attempt to detect the sample data of the one or more data element types.

Disclosed embodiments may include a system for automated generative data loss prevention testing. The system may include one or more processors, and memory in communication with the one or more processors and storing instructions that, when executed by the one or more processors, are configured to cause the system to provide automated generative data loss prevention testing by receiving an instruction to perform data exfiltration prevention testing. In some embodiments, the memory, when executed by the one or more processors, are further configured to select, based on the instruction to perform data exfiltration prevention testing, one or more data element types and one or more data channels upon which to perform the data exfiltration prevention testing, select, based on the one or more data element types, one or more test data generation programs from a plurality of test data generation programs, and generate, using the one or more test data generation programs, a set of test data that comprises sample data of the one or more data element types. In some embodiments, the memory, when executed by the one or more processors, are further configured to output the set of test data to a test executor queue for execution of the data exfiltration prevention testing.

Disclosed embodiments may include a system for automated generative data loss prevention testing. The system may include one or more processors, and memory in communication with the one or more processors and storing instructions that, when executed by the one or more processors, are configured to cause the system to provide automated generative data loss prevention testing by receiving, from a user device and in response to a user input via a graphical user interface (GUI) of the user device, an instruction to perform data exfiltration prevention testing on a selected data element type using a selected test channel and selecting, based on at least the selected data element type, one or more test data generation programs from a plurality of test data generation programs. In some embodiments, the memory, when executed by the one or more processors, are further configured to generate, using the one or more test data generation programs, a set of test data that comprises sample data of the selected data element type, generate one or more test files, wherein each of the one or more test files comprises at least a portion of the set of test data, and transmit the one or more test files via the selected test channel.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for automated generative data loss prevention testing. More particularly, the disclosed technology relates to generating a set of test data for use during testing of data exfiltration prevention software programs. The systems and methods described herein utilize, in some instances, machine learning models, which are necessarily rooted in computers and technology. Machine learning models are a unique computer technology that involves training models to complete tasks and make decisions. The present disclosure details how to generate a set of test data for use in data loss prevention testing. This, in some examples, may involve using usage and historical data element types and data channels as input data and a machine learning model, applied to recommend optimal data element types and data channels for testing, and outputs a result of data element types and data channels to be used in the set of test data. Using a machine learning model in this way may allow the system to create an optimal set of test data to test data exfiltration prevention software programs. This is a clear advantage and improvement over prior technologies that manually create test data because the manual creation of test data is highly inefficient, time consuming, and costly. The present disclosure solves this problem by using machine learning models, graphical user interfaces, and algorithms to generate a set of test data automatically and dynamically. Overall, the systems and methods disclosed have significant practical applications in the field because of the noteworthy improvements of the creation of sets of test data, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
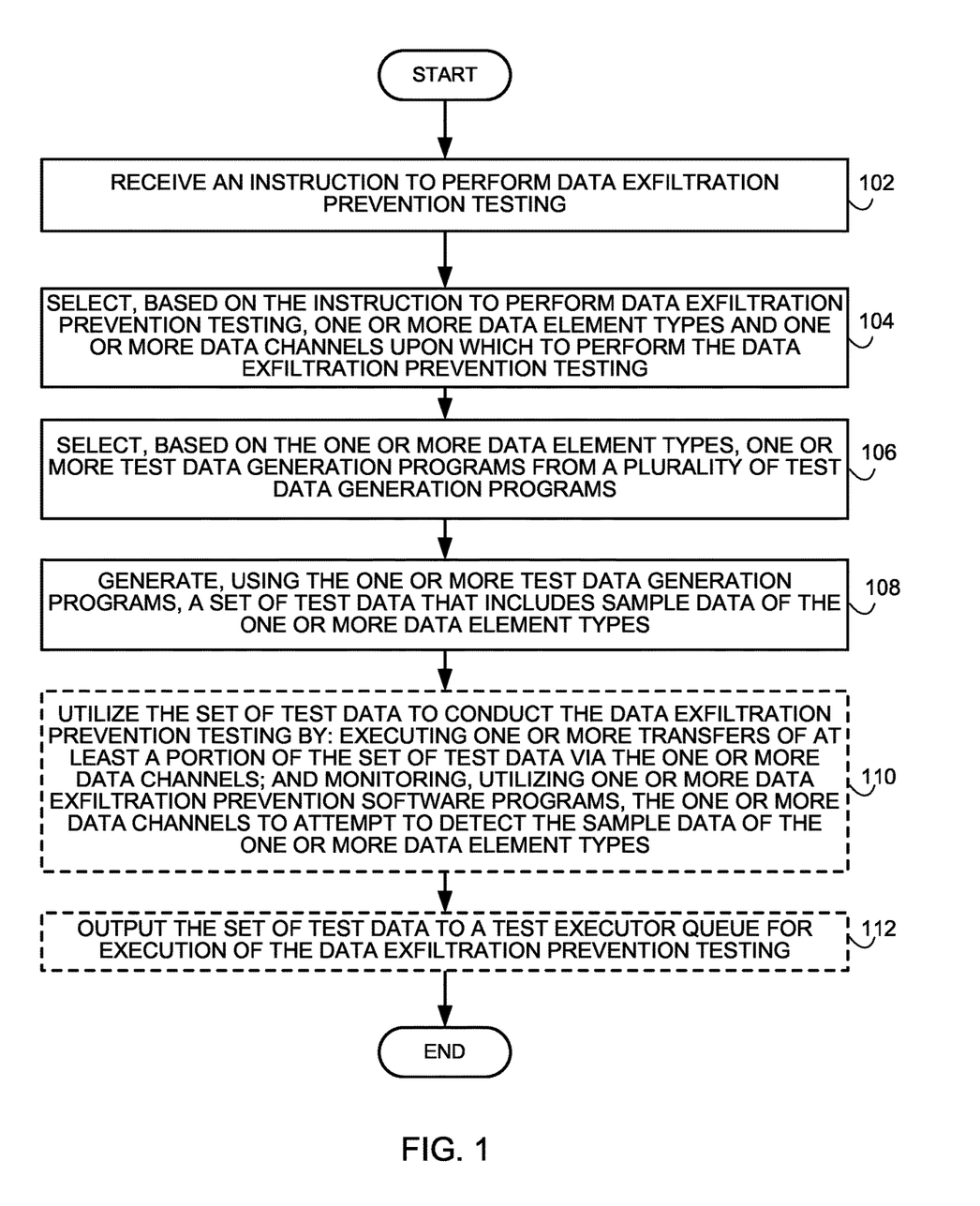
FIG. 1 is a flow diagram illustrating an exemplary method for automated generative data loss prevention testing in accordance with certain embodiments of the disclosed technology.

FIG. 1 is a flow diagram illustrating an exemplary method 100 for automated generative data loss prevention testing, in accordance with certain embodiments of the disclosed technology. The steps of method 100 may be performed by one or more components of the system 400 (e.g., dynamic test data generation system 320 or web server 410 of DLP system 408 or user device 402), as described in more detail with respect to FIGS. 3 and 4.

In block 102, the dynamic test data generation system 320 may receive an instruction to perform data exfiltration prevention testing. In some embodiments, the dynamic test data generation system 320 may receive the instruction from the user device 402. In some embodiments, the instruction is one of a plurality of instructions that are automated to be sent repeatedly from a user device 402 after a set period has passed (i.e., the dynamic test data generation system 320 may receive the automated instructions on a daily, weekly, monthly, yearly, etc. basis). In other embodiments, the dynamic test data generation system 320 may receive the instruction on demand from the user device 402 (i.e., the instruction may not be automated to be received on a set schedule or a user of the user device 402 may send the instruction in addition to the automated instructions). In some embodiments, the dynamic test data generation system 320 can automatically initiate the performance of data exfiltration prevention testing without receiving the instructions.

In block 104, the dynamic test data generation system 320 may select, based on the instruction to perform data exfiltration prevention testing, one or more data element types and one or more data channels upon which to perform the data exfiltration prevention testing. In some embodiments, the instruction can include the one or more data element types and the one or more data channels selected by the user via the user device 402 for the data exfiltration prevention testing. The one or more data element types can include a social security number, a primary account number, a national insurance number, a social insurance number, a bank account number, a tax identification number, an employer identification number, a driver's license number, a passport number, a unique identification number, or other private data elements known in the art. The one or more data channels can include one or more of: an email channel, a network channel, an endpoint channel, a web channel, a cloud channel, or other data channels known in the art.

In other embodiments, the instruction may include no data element types or data channels. The dynamic test data generation system 320 may determine, using a machine learning model, the one or more data element types and the one or more data channels for the data exfiltration prevention testing. The machine learning model may be a neural network of a framework of machine learning algorithms that work together to recommend the one or more data element types and the one or more data channels for the data exfiltration prevention testing based on a previous training process.

During the previous training process, the dynamic test data generation system 320 may retrieve, from the dynamic test data generation system database 360, usage data and historical dynamic test data associated with the user. The machine learning model can be trained using training sets of usage data and dynamic test data to determine the one or more data element types that need to be tested and the one or more data channels that need to be tested. The machine learning model may be trained to select the one or more data element types and the one or more data channels based on the usage data by determining used data element types (i.e., whether the user uses social security numbers more than bank account numbers etc., or never uses a unique identification number etc.) and used data channels (i.e., whether the user uses the email channel more than the cloud channel or never uses a web channel etc.). The machine learning model may be trained to select the one or more data element types and the one or more data channels also based on the historical dynamic test data by determining historical data element types and historical data channels. Historical data element types may indicate data element types previously selected by the user that should be re-selected for testing. Additionally, historical data element types may indicate that a set period of time has passed since one of the historical data element types have been tested. The machine learning model may be trained that when the set period of time is over a threshold, the one of the historical data element types that have not been tested during the set period of time, should be selected now for testing. The machine learning model, using the framework of machine learning algorithms that work together, may be trained to determine and recommend an optimal one or more data element types and an optimal one or more data channels based on a comparison between the used data element types, used data channels, historical data element types, historical data channels, or combinations thereof. In some embodiments, the dynamic test data generation system 320 may, using the recommendation from the machine learning model, select the optimal one or more data element types as the one or more data element types and the optimal one or more data channels as the one or more data channels for the data exfiltration prevention testing.

In some embodiments, the dynamic test data generation system 320 may generate a graphical user interface (GUI) including the optimal one or more data element types and the optimal one or more data channels. The dynamic test data generation system 320 may transmit, the GUI, to the user device 402. The dynamic test data generation system 320 may then receive, via the GUI, a response from the user via the user device 402. The response can include one or more confirmed data element types from the one or more data element types and one or more confirmed data channels from the one or more data channels to be selected for the data exfiltration prevention testing.

During a retraining process, the dynamic test data generation system 320 may store, in the dynamic test data generation system database 360, the one or more data element types and one or more confirmed data channels from the response and associate both to the user. The machine learning model can then be retrained later to recommend data element types and data channels in the future based on a preference of the user by: comparing the one or more data element types and one or more confirmed data channels from the response to the optimal one or more data element types and the optimal one or more data channels; determining an overlap of data element types and data channels between the one or more data element types and one or more confirmed data channels from the response to the optimal one or more data element types and the optimal one or more data channels; determining a pattern between the overlap and the used data element types, used data channels, historical data element types, historical data channels, or combinations thereof. The dynamic test data generation system 320 may then retrain the machine learning model based on the pattern.

In other embodiments, during the retraining process, if the instruction initially received in block 102 includes the one or more data element types and the one or more data channels selected by the user via the user device 402 for the data exfiltration prevention testing, the dynamic test data generation system 320 may store, in the dynamic test data generation system database 360, the one or more data element types as the used data element types and the one or more data channels as the used data channels and associate both to the user. The machine learning model can then be retrained later using the used data element types and the used data channels by using the previous training process described above (and not repeated herein for brevity).

In block 106, the dynamic test data generation system 320 may select, based on the one or more data element types, one or more test data generation programs from a plurality of test data generation programs. In some embodiments, the dynamic test data generation system 320 may select the one or more test data generation programs by using a mapping between the plurality of test data generation programs and the one or more data element types. In other embodiments, all of the available data element types and data channels may form a unique combination. The mapping can also be between the plurality of test data generation programs and the unique combination of data element types and data channels.

In block 108, the dynamic test data generation system 320 may generate, using the one or more test data generation programs, a set of test data that includes sample data of the one or more data element types. The dynamic test data generation system 320 may generate, using the one or more test data generation programs, one or more test data generation programs can comply with standards required for each of the one or more data element types. In a non-limiting example, a country may require a specific format for a tax identification number (i.e., polish tax identification numbers require the last digits to be a checksum). The one or more test data generation programs may include mathematical formulas configured to adhere to the required specific format for the tax identification number (i.e., the one or more test data generation programs may generate a mock tax identification number that conforms with the checksum requirement). The dynamic test data generation system 320 may use the one or more test data generation programs which include a plurality of formulas to generate the set of test data. The one or more test data generation programs can adhere to any required specific format for each of the one or more data elements.

In optional block 110, the dynamic test data generation system 320 may utilize the set of test data to conduct the data exfiltration prevention testing by: executing one or more transfers of at least a portion of the set of test data via the one or more data channels (executing either automatically after the execution of block 108 or by the dynamic test data generation system 320); and monitoring, utilizing one or more data exfiltration prevention software programs, the one or more data channels to attempt to detect the sample data of the one or more data element types. As outlined above, the one or more data channels can include one or more of: an email channel, a network channel, an endpoint channel, a web channel, a cloud channel, or other data channels known in the art. When the one or more data channels include the email channel, the dynamic test data generation system 320 may connect to an application programming interface (API)

to execute the one or more transfers of at least a portion of the set of test data. When the one or more data channels include the network channel (i.e., a website), the dynamic test data generation system 320 may simulate the one or more transfers of at least a portion of the set of test data through the website (i.e., simulate a malicious actor inputting a social security number through a form of a website). When the one or more data channels include the endpoint channel (i.e., such as a user device 402), the dynamic test data generation system 320 may simulate the one or more transfers of at least a portion of the set of test data to a designated device or a virtual machine (i.e., stage transferring the test data to a laptop by sending it to the virtual machine or designated device). When the one or more data channels include the cloud channel (i.e., such as an Amazon Web Service or AWS or a similar cloud infrastructure), the dynamic test data generation system 320 may execute the one or more transfers to an S3 bucket with at least a portion of the set of test data. The dynamic test data generation system 320 may then scan the S3 bucket using an S3 tool to generate a log that can be analyzed by the dynamic test data generation system 320. If the one or more data channels include the cloud channel as a google drive or similar cloud infrastructure, an API can be used to transfer at least a portion of the set of test data to the google drive. Then, the dynamic test data generation system 320 may then scan the google drive and generate a log to be analyzed.

In a non-limiting example, the set of test data can include emails with social security numbers, and the dynamic test data generation system 320 may transfer at least a portion of the emails via a selected email channel of the one or more data channels. The user may already have previously purchased one or more data exfiltration prevention software programs. The dynamic test data generation system 320 may then be able to compare the transferred portion of the emails to detected (or blocked) emails from the one or more data exfiltration prevention software programs. When a number of detected transfers (or blocked transfers) from the one or more data exfiltration prevention software programs is less than the one or more transfers actually executed, then this can be an indication that the one or more data exfiltration prevention software programs are not optimal (The logs and transfers described in optional block 110 can also be similarly compared to the one or more transfers actually executed). The machine learning model can be trained and retrained to generate a score based on the comparison between the detections from the one or more data exfiltration prevention software programs and the one or more transfers actually executed.

In optional block 112, the dynamic test data generation system 320 may output the set of test data to a test executor queue for execution of the data exfiltration prevention testing. In some embodiments, the dynamic test data generation system 320 may execute, using the test executor queue and the set of test data, the data exfiltration prevention testing. The test executor queue may return logs comprising one or more policies that were activated during the execution or testing of the set of test data. The dynamic test data generation system 320 may analyze the logs to determine whether one or more policies prevented the exfiltration of the set of test data or if the one or more data exfiltration prevention software programs prevented the exfiltration of data. The dynamic test data generation system 320 may adjust the score for each of the one or more data exfiltration prevention software based on the logs. For example, when the dynamic test data generation system 320 determines that the one or more data exfiltration prevention software programs did not prevent the exfiltration or that a number of the one or more policies that prevented the exfiltration is above a predetermined threshold, the score of the one or more data exfiltration prevention software programs can be reduced or remain neutral because the one or more data exfiltration prevention software programs did not assist in preventing the exfiltration. In another non-limiting example, when the dynamic test data generation system 320 determines that the one or more data exfiltration prevention software programs prevented the exfiltration or that the number of the one or more policies that prevented the exfiltration is below a predetermined threshold, then the score of the one or more data exfiltration prevention software programs can increase. The machine learning model can be trained and retrained to generate the score for each of the one or more data exfiltration prevention software programs based on the logs or the one or more policies that prevented the exfiltration.

Figure 2:
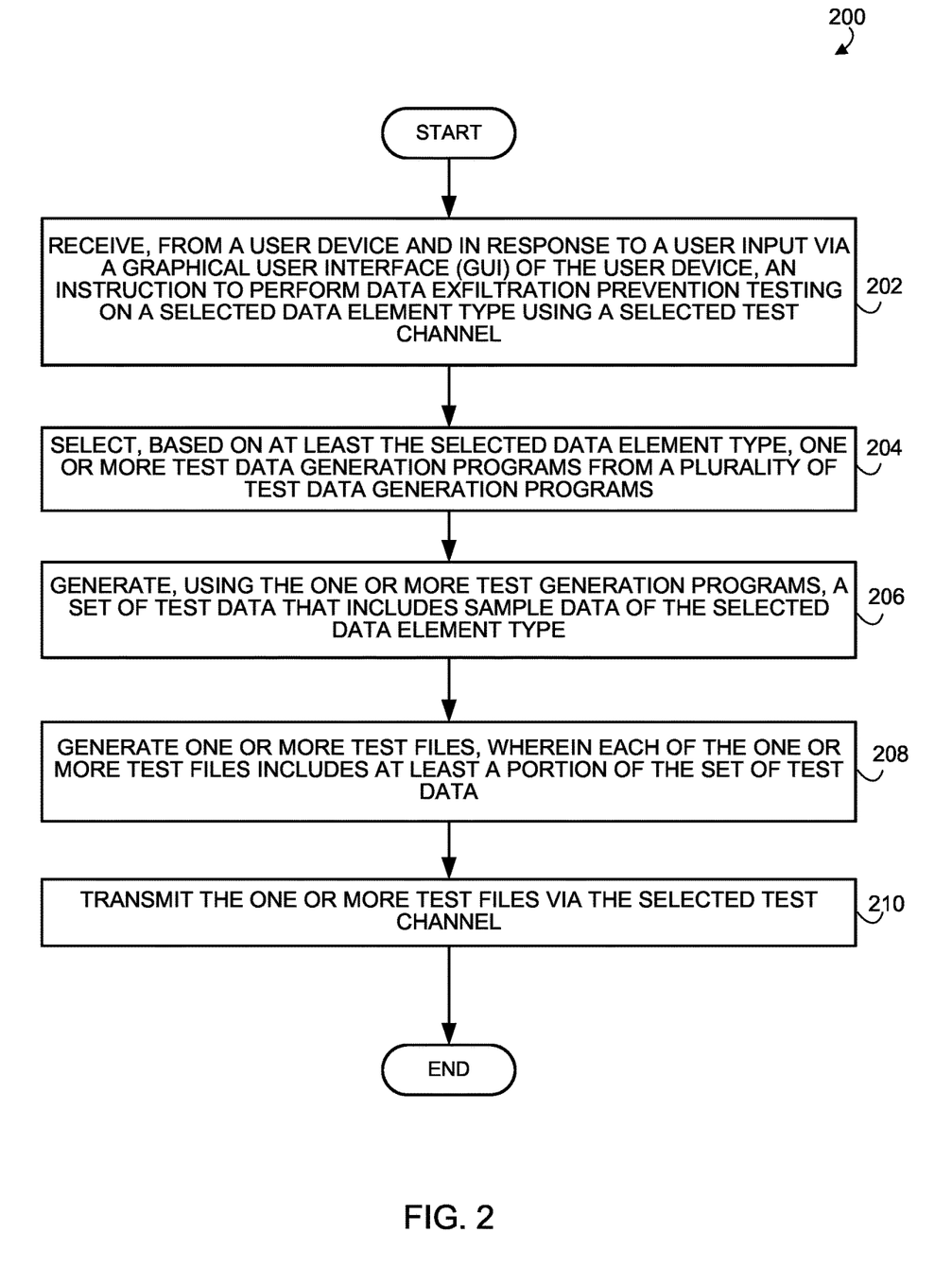
FIG. 2 is a flow diagram illustrating an exemplary method for automated generative data loss prevention testing in accordance with certain embodiments of the disclosed technology.

FIG. 2 is a flow diagram illustrating an exemplary method 200 for automated generative data loss prevention testing, in accordance with certain embodiments of the disclosed technology. The steps of method 200 may be performed by one or more components of the system 400 (e.g., dynamic test data generation system 320 or web server 410 of DLP system 408 or user device 402), as described in more detail with respect to FIGS. 3 and 4.

Method 200 of FIG. 2 is similar to method 100 of FIG. 1, except that method 200 may not include block 110 of method 100. The descriptions of blocks 202, 204, 206 in method 200 are similar to the respective descriptions of blocks 102, 104, 106, 108 of method 100 and are not repeated herein for brevity. However, block 210 is different from block 112 and is described below. Additional block 208 is also described below.

In block 208, the dynamic test data generation system 320 may generate one or more test files, wherein each of the one or more test files includes at least a portion of the set of test data. In a non-limiting example, the set of test data as described in block 108 can be the tax identification number. The dynamic test data generation system 320 may generate a tax identification card photograph test file that displays the tax identification number. Instead of just using the tax identification number in tests as described in optional block 110, the dynamic test data generation system 320 may also utilize test files for testing.

In block 210, the dynamic test data generation system 320 may transmit the one or more test files via the selected test channel. Similar to optional block 110, the dynamic test data generation system 320 may utilize the one or more test files to conduct the data exfiltration prevention testing by transmitting the one or more test files via the selected test channel. Continuing the non-limiting example from block 208, the dynamic test data generation system 320 may transmit the tax identification card photograph test file through an email channel to see if the one or more data exfiltration prevention software programs detect or block the transmission.

Figure 3:
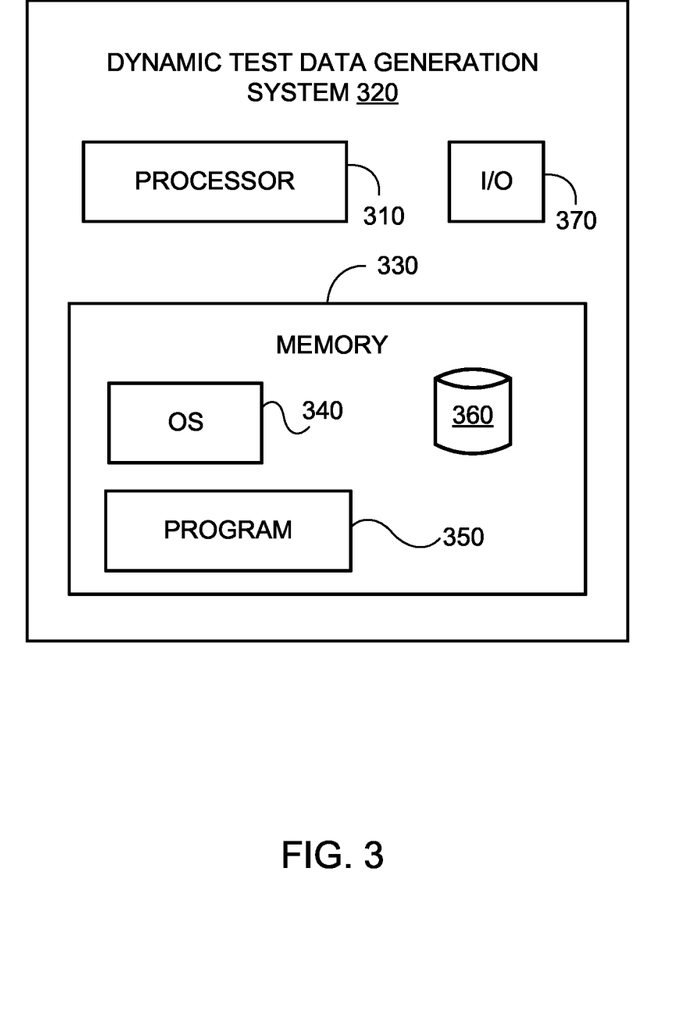
FIG. 3 is a block diagram of an example dynamic test data generation system used to provide automated generative data loss prevention testing, according to an example implementation of the disclosed technology.
Figure 4:
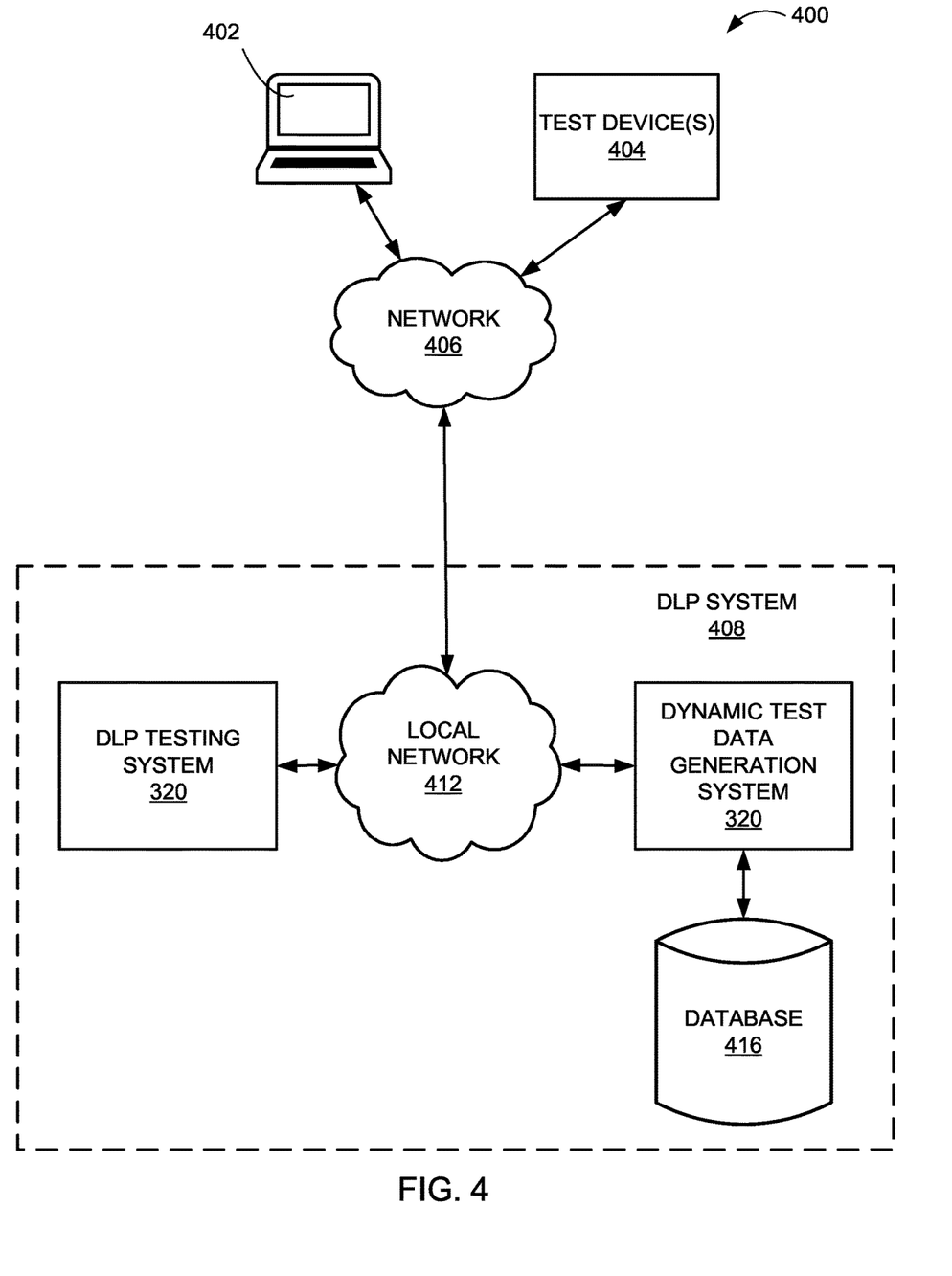
FIG. 4 is a block diagram of an example system that may be used to provide automated generative data loss prevention testing, according to an example implementation of the disclosed technology.

FIG. 3 is a block diagram of an example dynamic test data generation system 320 used to generate the set of test data according to an example implementation of the disclosed technology. According to some embodiments, the user device 402 and web server 410, as depicted in FIG. 4 and described below, may have a similar structure and components that are similar to those described with respect to dynamic test data generation system 320 shown in FIG. 3. As shown, the dynamic test data generation system 320 may include a processor 310, an input/output (I/O) device 370, a memory 330 containing an operating system (OS) 340 and a program 350. In certain example implementations, the dynamic test data generation system 320 may be a single server or may be configured as a distributed computer system including multiple servers or computers that interoperate to perform one or more of the processes and functionalities associated with the disclosed embodiments. In some embodiments dynamic test data generation system 320 may be one or more servers from a serverless or scaling server system. In some embodiments, the dynamic test data generation system 320 may further include a peripheral interface, a transceiver, a mobile network interface in communication with the processor 310, a bus configured to facilitate communication between the various components of the dynamic test data generation system 320, and a power source configured to power one or more components of the dynamic test data generation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the dynamic test data generation system 320 may include one or more storage devices configured to store information used by the processor 310 (or other components) to perform certain functions related to the disclosed embodiments. In one example, the dynamic test data generation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The dynamic test data generation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the dynamic test data generation system 320 may include the memory 330 that may include one or more programs 350 to perform one or more functions of the disclosed embodiments. For example, in some embodiments, the dynamic test data generation system 320 may additionally manage dialogue and/or other interactions with the customer via a program 350.

The processor 310 may execute one or more programs 350 located remotely from the dynamic test data generation system 320. For example, the dynamic test data generation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a dynamic test data generation system database 360 for storing related data to enable the dynamic test data generation system 320 to perform one or more of the processes and functionalities associated with the disclosed embodiments.

The dynamic test data generation system database 360 may include stored data relating to status data (e.g., average session duration data, location data, idle time between sessions, and/or average idle time between sessions) and historical status data. According to some embodiments, the functions provided by the dynamic test data generation system database 360 may also be provided by a database that is external to the dynamic test data generation system 320, such as the database 416 as shown in FIG. 4.

The dynamic test data generation system 320 may also be communicatively connected to one or more memory devices (e.g., databases) locally or through a network. The remote memory devices may be configured to store information and may be accessed and/or managed by the dynamic test data generation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The dynamic test data generation system 320 may also include one or more I/O devices 370 that may comprise one or more interfaces for receiving signals or input from devices and providing signals or output to one or more devices that allow data to be received and/or transmitted by the dynamic test data generation system 320. For example, the dynamic test data generation system 320 may include interface components, which may provide interfaces to one or more input devices, such as one or more keyboards, mouse devices, touch screens, track pads, trackballs, scroll wheels, digital cameras, microphones, sensors, and the like, that enable the dynamic test data generation system 320 to receive data from a user (such as, for example, via the user device 402).

In examples of the disclosed technology, the dynamic test data generation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The dynamic test data generation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The dynamic test data generation system 320 may be configured to adjust model parameters during training. Model parameters may include weights, coefficients, offsets, or the like. Training may be supervised or unsupervised.

The dynamic test data generation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The dynamic test data generation system 320 may be configured to optimize statistical models using known optimization techniques.

Furthermore, the dynamic test data generation system 320 may include programs configured to retrieve, store, and/or analyze properties of data models and datasets. For example, dynamic test data generation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The dynamic test data generation system 320 may include algorithms to determine a data type, key-value pairs, row-column data structure, statistical distributions of information such as keys or values, or other property of a data schema may be configured to return a statistical profile of a dataset (e.g., using a data-profiling model). The dynamic test data generation system 320 may be configured to implement univariate and multivariate statistical methods. The dynamic test data generation system 320 may include a regression model, a Bayesian model, a statistical model, a linear discriminant analysis model, or other classification model configured to determine one or more descriptive metrics of a dataset. For example, dynamic test data generation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The dynamic test data generation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, dynamic test data generation system 320 may be configured to generate a similarity metric representing a measure of similarity between data in a dataset. A similarity metric may be based on a correlation, covariance matrix, a variance, a frequency of overlapping values, or other measure of statistical similarity.

The dynamic test data generation system 320 may be configured to generate a similarity metric based on data model output, including data model output representing a property of the data model. For example, dynamic test data generation system 320 may be configured to generate a similarity metric based on activation function values, embedding layer structure and/or outputs, convolution results, entropy, loss functions, model training data, or other data model output). For example, a synthetic data model may produce first data model output based on a first dataset and a produced data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The dynamic test data generation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

The dynamic test data generation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, dynamic test data generation system 320 is configured to generate and/or train a classification model to classify a dataset, consistent with disclosed embodiments.

The dynamic test data generation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via one or more weighted connections. Prediction models may additionally or alternatively include classification and regression trees, or other types of models known to those skilled in the art. To generate prediction models, the dynamic test data generation system may analyze information applying machine-learning methods.

While the dynamic test data generation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the dynamic test data generation system 320 may include a greater or lesser number of components than those illustrated.

FIG. 4 is a block diagram of an example system that may be DLP system 408, according to an example implementation of the disclosed technology. The components and arrangements shown in FIG. 4 are not intended to limit the disclosed embodiments as the components used to implement the disclosed processes and features may vary. As shown, DLP system 408 may interact with a user device 402 via a network 406. In certain example implementations, the DLP system 408 may include a local network 412, a dynamic test data generation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the DLP system 408. In some embodiments, the user device 402 may include or incorporate electronic communication devices for hearing or vision impaired users.

According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The DLP system 408 may be associated with and optionally controlled by one or more entities such as a business, corporation, individual, partnership, or any other entity that provides one or more of goods, services, and consultations to individuals such as customers. In some embodiments, the DLP system 408 may be controlled by a third party on behalf of another business, corporation, individual, partnership, etc. The DLP system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via, for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that is authenticated by the dynamic test data generation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the DLP system 408 to interact with one another and to connect to the network 406 for interacting with components in the system 400 environment. In some embodiments, the local network 412 may include an interface for communicating with or linking to the network 406. In other embodiments, certain components of the DLP system 408 may communicate via the network 406, without a separate local network 406.

The DLP system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access DLP system 408 using the cloud computing environment. User device 402 may be able to access DLP system 408 using specialized software. The cloud computing environment may eliminate the need to install specialized software on user device 402.

In accordance with certain example implementations of the disclosed technology, the DLP system 408 may include one or more computer systems configured to compile data from a plurality of sources, such as, but not limited to, the dynamic test data generation system 320, web server 410, and/or the database 416. The dynamic test data generation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets.

Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

EXAMPLE USE CASE

The following example use case describes an example of a typical user flow pattern. This section is intended solely for explanatory purposes and not in limitation.

In one example, a financial provider is a user and frequently conducts data loss prevention testing. The financial provider sends an instruction to perform data exfiltration prevention testing to the dynamic test data generation system 320. The instruction includes a selection of one or more data element types to be a social security number (SSN) and a tax identification number (TID) along with a selection of a data channel to be an email channel (if a selection is not provided, the dynamic test data generation system 320 can look at the history and usage of the financial provider to recommend data element types and channels). The dynamic test data generation system 320 selects, based on the instruction to perform data exfiltration prevention testing, the one or more data element types as the SSN and the TID and the one or more data channels as the email channel upon which to perform the data exfiltration prevention testing. The dynamic test data generation system 320 can then use the mapping to select, one or more test data generation programs from a plurality of test data generation programs related to SSNs and TIDs to be able to generate random mock SSNs and mock TIDs in the proper format. The dynamic test data generation system 320 then generates, using the one or more test data generation programs, a set of test data that comprises sample data of the one or more data element types. The set of test data can then be used for data loss prevention testing of data exfiltration prevention software programs. The dynamic test data generation system 320 can execute transfers of the emails with SSNs and TIDs through an email channel to see how many emails are blocked or detected by the data exfiltration prevention software programs. The dynamic test data generation system 320 can also use a machine learning model to give a score to the financial provider of the efficiency of the current data exfiltration prevention software programs being used.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive an instruction to perform data exfiltration prevention testing; select, based on the instruction to perform data exfiltration prevention testing, one or more data element types and one or more data channels upon which to perform the data exfiltration prevention testing; select, based on the one or more data element types, one or more test data generation programs from a plurality of test data generation programs; generate, using the one or more test data generation programs, a set of test data that comprises sample data of the one or more data element types; and utilize the set of test data to conduct the data exfiltration prevention testing by: executing one or more transfers of at least a portion of the set of test data via the one or more data channels; and monitoring, utilizing one or more data exfiltration prevention software programs, the one or more data channels to attempt to detect the sample data of the one or more data element types.

Clause 2: The system of clause 1, wherein the one or more data element types comprise one or more of: a social security number; a primary account number; a national insurance number; a social insurance number; a bank account number; a tax identification number; an employer identification number; a driver's license number; a passport number; or a unique identification number.

Clause 3: The system of clause 1, wherein the one or more data channels comprise one or more of: an email channel; a network channel; an endpoint channel; a web channel; and a cloud channel.

Clause 4: The system of clause 1, wherein the sample data of the one or more data element types comprise test data examples that adhere to specifications associated with the one or more data element types.

Clause 5: The system of clause 1, wherein the sample data of the one or more data element types comprise a plurality of test data examples of a same one of the one or more data element types, the plurality of test data examples having variations in one or more of: a delimiter; one or more keywords; and a volume.

Clause 6: The system of clause 1, wherein generating the set of test data comprises generating a plurality of different file types comprising at least a portion of the sample data, wherein the plurality of different file types comprises one or more of: a word processing file; a spreadsheet file; an image file; and a pdf file.

Clause 7: The system of clause 1, wherein generating the set of test data is performed dynamically at runtime based on a system time.

Clause 8: A system comprising: one or more processors; and a memory in communication with the one or more processors and storing instructions that, when executed by the one or more processors, are configured to cause the system to: receive an instruction to perform data exfiltration prevention testing; select, based on the instruction to perform data exfiltration prevention testing, one or more data element types and one or more data channels upon which to perform the data exfiltration prevention testing; select, based on the one or more data element types, one or more test data generation programs from a plurality of test data generation programs; generate, using the one or more test data generation programs, a set of test data that comprises sample data of the one or more data element types; and output the set of test data to a test executor queue for execution of the data exfiltration prevention testing.

Clause 9: The system of clause 8, wherein the one or more data element types comprise one or more of: a social security number; a primary account number; a national insurance number; a social insurance number; a bank account number; a tax identification number; an employer identification number; a driver's license number; a passport number; or a unique identification number.

Clause 10: The system of clause 8, wherein the one or more data channels comprise one or more of: an email channel; a network channel; an endpoint channel; a web channel; and a cloud channel.

Clause 11: The system of clause 8, wherein the sample data of the one or more data element types comprise test data examples that adhere to specifications associated with the one or more data element types.

Clause 12: The system of clause 8, wherein the sample data of the one or more data element types comprise a plurality of test data examples of a same one of the one or more data element types, the plurality of test data examples having variations in one or more of: a delimiter; one or more keywords; and a volume.

Clause 13: The system of clause 8, wherein generating the set of test data comprises generating a plurality of different file types comprising at least a portion of the sample data, wherein the plurality of different file types comprises one or more of: a word processing file; a spreadsheet file; an image file; and a pdf file.

Clause 14: The system of clause 8, wherein generating the set of test data is performed dynamically at runtime.

Clause 15: A system comprising: one or more processors; and a memory in communication with the one or more processors and storing instructions that, when executed by the one or more processors, are configured to cause the system to: receive, from a user device and in response to a user input via a graphical user interface (GUI) of the user device, an instruction to perform data exfiltration prevention testing on a selected data element type using a selected test channel; select, based on at least the selected data element type, one or more test data generation programs from a plurality of test data generation programs; generate, using the one or more test data generation programs, a set of test data that comprises sample data of the selected data element type; generate one or more test files, wherein each of the one or more test files comprises at least a portion of the set of test data; and transmit the one or more test files via the selected test channel.

Clause 16: The system of clause 15, wherein the one or more test files comprise one or more of: a word processing file; a spreadsheet file; an image file; and a pdf file.

Clause 17: The system of clause 15, wherein the selected test channel comprises one of: an email channel; a network channel; an endpoint channel; a web channel; and a cloud channel.

Clause 18: The system of clause 17, wherein transmitting the one or more test files via the selected test channel comprises one of: sending an email comprising the one or more test files; entering the one or more test files or data from the one or more test files into a network chat box; downloading the one or more test files to a specified device; uploading the one or more test files to a website; inputting data from the one or more test files into a fillable form hosted by a website; and staging the one or more test files in a specified cloud storage location.

Clause 19: The system of clause 15, wherein the instructions are further configured to cause the system to: receive, from the user device, an indication of one or more of a specified delimiter, a specified volume and a specified keyword, wherein generating the set of test data comprises generating sample data that comprises the one or more of the specified delimiters, the specified volume and the specified keyword.

Clause 20: The system of clause 15, wherein generating the set of test data is performed dynamically at runtime based on a system time.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
a memory in communication with the one or more processors and storing instructions that, when executed by the one or more processors, are configured to cause the system to:
receive an instruction to perform data exfiltration prevention testing;
select, based on the instruction to perform data exfiltration prevention testing, one or more data element types and one or more data channels upon which to perform the data exfiltration prevention testing;
select, based on the one or more data element types, one or more test data generation programs from a plurality of test data generation programs;
generate, using the one or more test data generation programs, a set of test data that comprises sample data of the one or more data element types; and
utilize the set of test data to conduct the data exfiltration prevention testing by:
executing one or more transfers of at least a portion of the set of test data via the one or more data channels; and
monitoring, utilizing one or more data exfiltration prevention software programs, the one or more data channels to attempt to detect the sample data of the one or more data element types.

2. The system of claim 1, wherein the one or more data element types comprise one or more of:
a social security number;
a primary account number;
a national insurance number;
a social insurance number;
a bank account number;
a tax identification number;
an employer identification number;
a driver's license number;
a passport number; or
a unique identification number.

3. The system of claim 1, wherein the one or more data channels comprise one or more of:
an email channel;
a network channel;
an endpoint channel;
a web channel; and
a cloud channel.

4. The system of claim 1, wherein the sample data of the one or more data element types comprise test data examples that adhere to specifications associated with the one or more data element types.

5. The system of claim 1, wherein the sample data of the one or more data element types comprise a plurality of test data examples of a same one of the one or more data element types, the plurality of test data examples having variations in one or more of:
a delimiter;
one or more keywords; and
a volume.

6. The system of claim 1, wherein generating the set of test data comprises generating a plurality of different file types comprising at least a portion of the sample data, wherein the plurality of different file types comprises one or more of:
a word processing file;
a spreadsheet file;
an image file; and
a pdf file.

7. The system of claim 1, wherein generating the set of test data is performed dynamically at runtime based on a system time.

8. A system comprising:
one or more processors; and
a memory in communication with the one or more processors and storing instructions that, when executed by the one or more processors, are configured to cause the system to:
receive an instruction to perform data exfiltration prevention testing;
select, based on the instruction to perform data exfiltration prevention testing, one or more data element types and one or more data channels upon which to perform the data exfiltration prevention testing;
select, based on the one or more data element types, one or more test data generation programs from a plurality of test data generation programs;
generate, using the one or more test data generation programs, a set of test data that comprises sample data of the one or more data element types; and
output the set of test data to a test executor queue for execution of the data exfiltration prevention testing.

9. The system of claim 8, wherein the one or more data element types comprise one or more of:
a social security number;
a primary account number;
a national insurance number;
a social insurance number;
a bank account number;
a tax identification number;
an employer identification number;
a driver's license number;
a passport number; or
a unique identification number.

10. The system of claim 8, wherein the one or more data channels comprise one or more of:
an email channel;
a network channel;
an endpoint channel;
a web channel; and
a cloud channel.

11. The system of claim 8, wherein the sample data of the one or more data element types comprise test data examples that adhere to specifications associated with the one or more data element types.

12. The system of claim 8, wherein the sample data of the one or more data element types comprise a plurality of test data examples of a same one of the one or more data element types, the plurality of test data examples having variations in one or more of:
a delimiter;
one or more keywords; and
a volume.

13. The system of claim 8, wherein generating the set of test data comprises generating a plurality of different file types comprising at least a portion of the sample data, wherein the plurality of different file types comprises one or more of:
a word processing file;
a spreadsheet file;
an image file; and
a pdf file.

14. The system of claim 8, wherein generating the set of test data is performed dynamically at runtime.

15. A system comprising:
one or more processors; and
a memory in communication with the one or more processors and storing instructions that, when executed by the one or more processors, are configured to cause the system to:
- receive, from a user device and in response to a user input via a graphical user interface (GUI) of the user device, an instruction to perform data exfiltration prevention testing on a selected data element type using a selected test channel;
- select, based on at least the selected data element type, one or more test data generation programs from a plurality of test data generation programs;
- generate, using the one or more test data generation programs, a set of test data that comprises sample data of the selected data element type;
- generate one or more test files, wherein each of the one or more test files comprises at least a portion of the set of test data; and
- transmit the one or more test files via the selected test channel.

16. The system of claim 15, wherein the one or more test files comprise one or more of:
a word processing file;
a spreadsheet file;
an image file; and
a pdf file.

17. The system of claim 15, wherein the selected test channel comprises one of:
an email channel;
a network channel;
an endpoint channel;
a web channel; and
a cloud channel.

18. The system of claim 17, wherein transmitting the one or more test files via the selected test channel comprises one of:
sending an email comprising the one or more test files;
entering the one or more test files or data from the one or more test files into a network chat box;
downloading the one or more test files to a specified device;
uploading the one or more test files to a website;
inputting data from the one or more test files into a fillable form hosted by a website; and
staging the one or more test files in a specified cloud storage location.

19. The system of claim 15, wherein the instructions are further configured to cause the system to:
receive, from the user device, an indication of one or more of a specified delimiter, a specified volume and a specified keyword,
wherein generating the set of test data comprises generating sample data that comprises the one or more of the specified delimiters, the specified volume and the specified keyword.

20. The system of claim 15, wherein generating the set of test data is performed dynamically at runtime based on a system time.

* * * * *